Oct. 11, 1966 D. C. LARKIN 3,278,008
LITTER BASKET
Filed Feb. 24, 1964
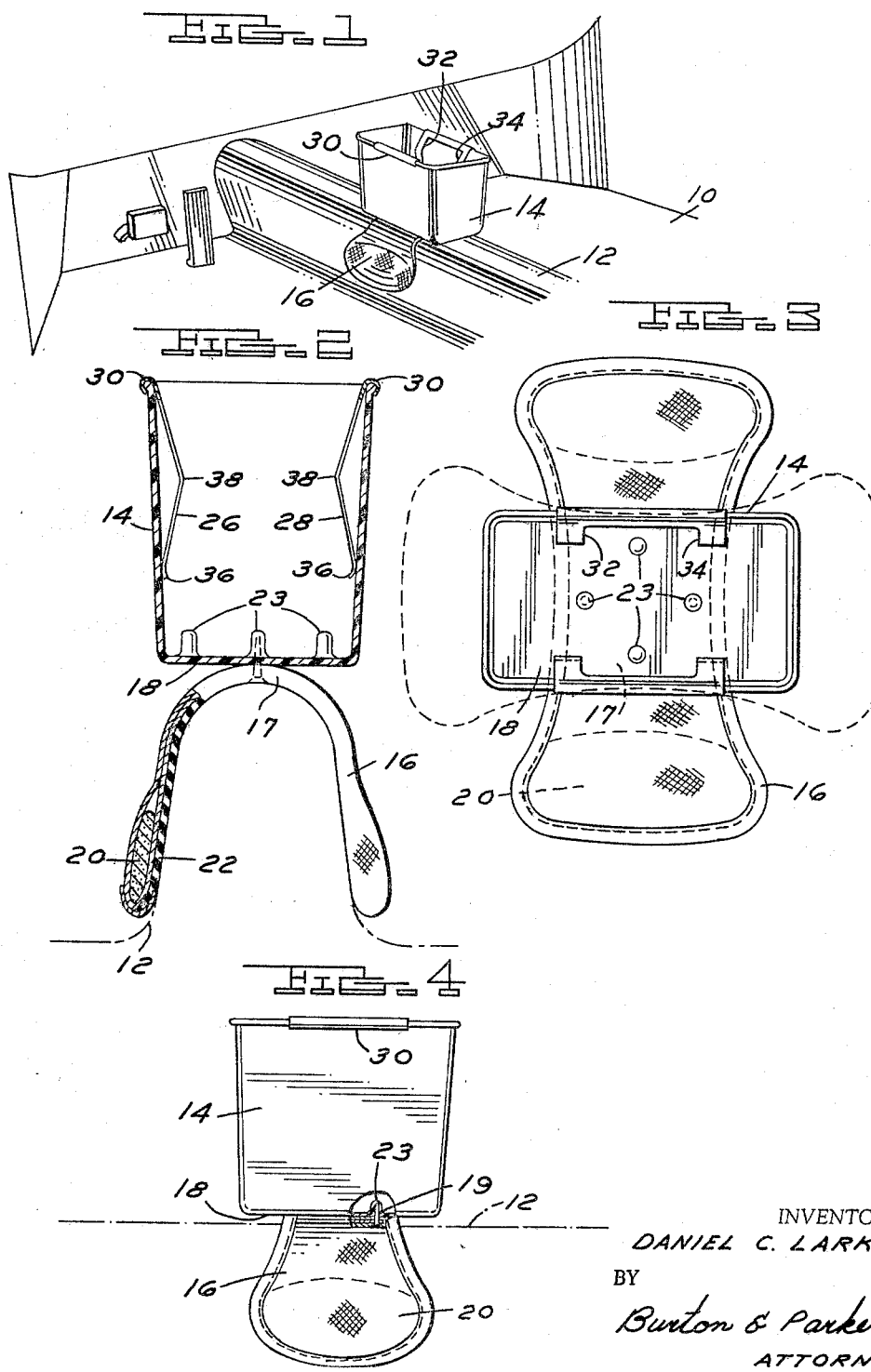
INVENTOR.
DANIEL C. LARKIN
BY
Burton & Parker
ATTORNEYS

United States Patent Office 3,278,008
Patented Oct. 11, 1966

3,278,008
LITTER BASKET
Daniel Charles Larkin, 3134 Woodstock Drive,
Detroit, Mich.
Filed Feb. 24, 1964, Ser. No. 346,678
1 Claim. (Cl. 206—19.5)

This invention relates to a refuse container particularly designed for use within a motor vehicle body to be removably supported upon the tunnel hump that is commonly found in present day motor vehicle bodies and which extends linearly along the center line of the floor but obviously the container might be used in any other place where it was suited for use.

An object is to provide such a refuse container which will maintain its position when seated upon such tunnel hump or upon the floor or upon a seat cushion and which may readily be moved, or removed for emptying its refuse contents.

Another object is the provision of such a container so that the occupants of a motor vehicle will not throw refuse from the open windows. It is common practice for many people to keep a bag or other container in a motor vehicle body to receive refuse but such is inconvenient.

It is obvious that this container might be employed to receive and contain articles other than refuse if so desired.

The container assembly is so constructed that it will frictionally engage the floor or other support in such a manner that it is not readily accidentally displaced or overturned.

The container is so constructed that in addition to the receptacle to receive the refuse there is what might be termed a base or weighted, frictional saddle bag assembly, which is so connected with the refuse containing box and which has end portions adapted normally to extend beyond the side walls of the box and adapted to drape downwardly therefrom to snugly overlie the top of a tunnel hump and the side walls thereof and to so frictionally engage such support as to maintain the container in the proper upright position. The character of the saddle bag assembly and its connection with the box is such that it is adapted to be adjusted with respect to the refuse containing box to best fit tunnel humps of varied contour and dimension.

The container box itself may be of a rectangular shape having a greater length than width and the saddle bag assembly is preferably so connected therewith as to permit the box to be adjustably positioned with respect thereto so that the box may extend linearly or crosswise of the tunnel hump and the saddle bag assembly will at all times snugly engage the tunnel hump to maintain the box upright thereupon.

The box may also be so formed as to exhibit inwardly downwardly projecting portions or means adapted to retain refuse therein against being accidentally thrown out of the box.

Other objects and advantages and meritorious features will more fully appear from the following specification, claim, and accompanying drawing.

FIG. 1 is a perspective of a portion of the interior of an automobile body forwardly of the front seat showing my container seated upon the top of the tunnel hump.

FIG. 2 is a transverse cross sectional view through the container shown in FIG. 1 seated on a schematic tunnel hump having a sharply rounded upper edge portion.

FIG. 3 is a top plan view of my container showing the end extensions of the saddle bag assembly in solid line projecting outwardly away from the long side walls of the box as shown in FIG. 1, and showing in dotted line such saddle bag extensions projecting outwardly away from the short end walls of the box.

FIG. 4 is a side elevation, partly broken away to show the connection of the saddle bag assembly with the bottom of the box.

In the drawing a fragment of the floor of the interior of a closed automobile body forwardly of the front seat is indicated as 10. At 12 there is shown a conventional tunnel hump which is commonly provided in automobile bodies and extends linearly along the center line of the body to accommodate the drive shaft and permit lowering of the body close to the road surface. The top of this tunnel hump is in the form of a ridge which is used to support my refuse container. Such top portion may vary in contour from a shape which slopes downwardly almost from the linear center line of the hump as illustrated in FIG. 2 or it may have a relatively flat top face which slopes downwardly further out from the center line. My improved container assembly is adapted to fit any conventional contour of tunnel hump and any size thereof.

The container itself comprises a box like receptacle identified as 14 which is open at the top though obviously it might be provided with a lid if such were desired. The receptacle itself may be formed of any suitable material such as metal, plastic material, or fibrous composition board. The receptacle is light in weight and of relatively rugged construction and preferably provided in a material which provides an attractive appearance but is inexpensive.

Associated with the receptacle 14 is a supporting element 16 which is in the form of a saddle bag assembly. The supporting element 16 is adapted to have its intermediate portion 17 attached to the bottom 18 of the container by screws 19, bolts, rivets, or the like.

The end portions of this saddle bag assembly 16 are of a bag like character as shown in FIG. 2 and contain a weighted material 20 such as a loose granular substance. The saddle bag assembly itself is formed of plastic, artificial leather, closely woven fabric, or the like, which is flexible and durable and may be finished to present an attractive appearance. Sand may be used as the weighted material 20 in the end portions. It will be observed that the end portions have a greater width than the width of the intermediate portion of the saddle bag assembly so as to increase the frictional engagement with the tunnel hump and thereby serve to retain the container against being accidentally overturned.

The bottom of the saddle bag assembly is provided with a frictional facing 22 which may be formed of sponge rubber or a plastic sponge adhesively or otherwise secured thereto and which frictionally engages the surface upon which it is disposed so as to resist slidable movement of the container and maintain the same upright.

It will be seen that the bottom of the container is provided with interiorly screw threaded deformations 23 adapted interiorly to receive the screws 19 to secure the saddle bag assembly to the bottom of the container. Four such deformations are shown in FIG. 3 so that the saddle bag assembly may be secured to the bottom of the container to extend in two opposite directions with respect thereto.

For example, if the container is of rectangular construction and has a length greater than its width, the saddle bag assembly may be so secured thereto as to extend linearly thereof as shown in FIG. 3 in dotted outline, or to extend crosswise thereof as shown in solid line in the same figure. The direction of extension could depend upon the width of the tunnel hump at the top. If the tunnel hump had a wide top the box could be disposed so that its long sides extended crosswise of the hump. If the hump were of narrow width at the top and the sides sloped sharply downwardly greater stability would result if the container extended linearly as shown in FIGS. 1 and 2.

It is apparent that the two screws might be withdrawn from their positions shown in FIG. 2 and the saddle bag assembly shifted from the position shown in FIGS 1 and 2 and in solid line in FIG. 3, to that shown in dotted line in FIG. 3. At such new position it would have been moved 90 degrees and the screws reinserted but now into the two deformations located approximately on the transverse center line of the box rather than on the linear center line thereof. This permits varying the position of the box with respect to the saddle bag assembly as desired for the use of the container with the securement of saddle bag assembly to the bottom of the box on approximately the center line, which is disposed parallel of the center line of the hump.

It is also apparent that the securement of the box to the intermediate portion of the flexible saddle bag assembly is thereby such that the flexible end portions drape downwardly from the bottom of the box from a point adjacent to the center line of the box that is parallel to the hump center line, so that such end portions snugly overlie not only the side walls but also the top of the box underneath the bottom thereof.

This is for the purpose of providing that such saddle bag end portions will drape closely against a tunnel hump of a sharply rounded crown as well as one with a relatively flat crown. It will be observed that the deformations for receiving the screws are disposed in two pairs, one pair being in close proximity to the linear center line of the box, and the other pair being in close proximity to the transverse center line thereof. As shown they are substantially on such center lines.

This type of connection between the saddle bag assembly and the container and the permitted adjustment of the saddle bag assembly with respect to the container permits an adaptation of the container to all the different contours of humps of all of the different makes of automobile bodies and its safe positioning upon the tunnel hump regardless of contour and dimension.

The refuse container includes means for preventing refuse in the box from falling therefrom in the event that the container should be accidentally upset. Such means comprises, as shown in the drawings, a pair of spring-tensioned, clip-like members 26 and 28, each of which is formed with a channel shaped upper end portion 30 which is snapped over and grippingly engages the upper edge or rim of the box 14. Each clip includes a pair of depending arms 32 and 34, the lower ends of which are inturned as at 36 to bear against the inside surface of the box. Each arm is deflected inwardly as at 38 to provide a narrow areaway through the box for engaging the refuse therein to trap the same in place.

In operation, the person depositing refuse in the container will push the refuse down through the top of the box between the arms of the opposed clips, and such arms will engage the refuse, such as paper or the like, and hold the same within the box.

The arms 32 and 34 will deflect outwardly at their bowed portions 38, i.e. will deflect toward the walls of the box as refuse is pushed into the box, and will hold such refuse under spring tension from falling out of the box should the box be accidentally upset. It is to be understood that in normal operation the refuse container will remain upright on the tunnel hump 12 of the vehicle despite violent maneuvers of the vehicle. Upsetting of the container may occur should the same be accidentally kicked over by an occupant of the vehicle.

What I claim is:

A refuse container comprising, in combination: a generally rectangular container box having a bottom wall of greater length than width and two pairs of opposed side walls and being open at the top; an elongate flexible saddle bag assembly having opposed weighted end portions, with the bottom of said assembly provided with a friction facing adapted to frictionally engage the surface upon which the container is supported; and securing means operable to connect said saddle bag assembly to the bottom of the container box to extend thereacross, said securing means comprising two sets of securing members carried by the bottom of said box and a single set of cooperable securing members carried by said saddle bag assembly, said two sets of securing members carried by the bottom of the box being disposed substantially along the longitudinal and transverse center lines of the box bottom respectively, and said set of securing members on said saddle bag assembly being disposed substantially along the transverse center line of said saddle assembly, said securing members on the saddle assembly being alternatively connectible with and disconnectible from either of said two sets of securing members on the bottom of the box, whereby upon connection of said saddle securing members to one of said sets of securing members on the box the saddle member extends longitudinally of the box bottom and upon connection of the saddle securing members to the other of said sets of securing members on the box the saddle member extends transversely of the box bottom, said flexible end portions of the saddle bag assembly draping downwardly from the line of securement between the box bottom and the saddle assembly to snugly overlie the top and side walls of a tunnel hump upon which the refuse container is supported.

References Cited by the Examiner

UNITED STATES PATENTS

| | | | |
|---|---|---|---|
| 1,739,801 | 12/1929 | Pitts | 206—1 |
| 2,032,636 | 3/1936 | Seckinger | 220—3.9 |
| 3,028,702 | 4/1962 | St. Cyr | 215—100.5 |
| 3,109,537 | 11/1963 | Larkin | 206—19.5 |

THERON E. CONDON, *Primary Examiner.*

W. T. DIXSON, *Assistant Examiner.*